M. PARSONS.
COFFEE POT.
APPLICATION FILED JAN. 23, 1915.
1,172,041.
Patented Feb. 15, 1916.
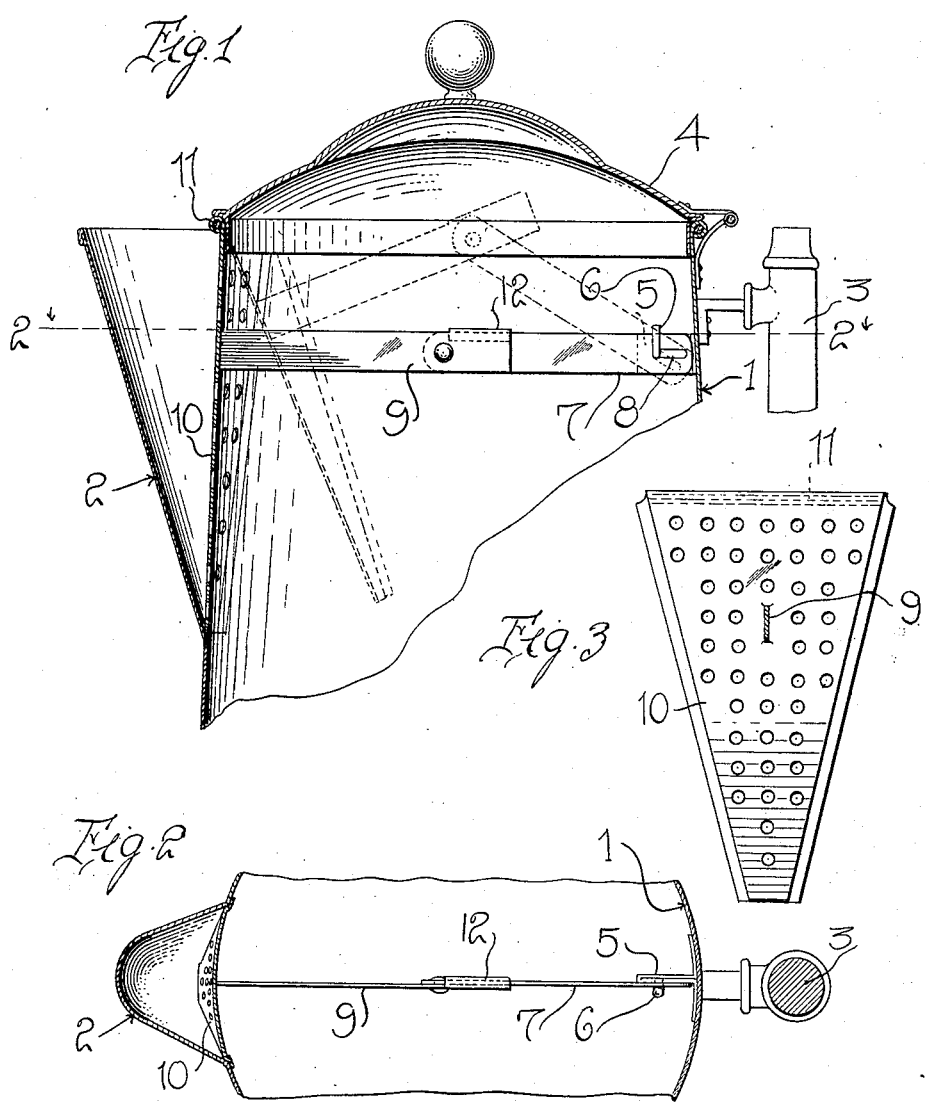
Witnesses
Robert M. Sutphen
A. I. Hind
Inventor
MARY PARSONS
By Watson E. Coleman
Attorney

UNITED STATES PATENT OFFICE.

MARY PARSONS, OF WICHITA, KANSAS.

COFFEE-POT.

1,172,041. Specification of Letters Patent. Patented Feb. 15, 1916.

Application filed January 23, 1915. Serial No. 3,978.

*To all whom it may concern:*

Be it known that I, MARY PARSONS, a citizen of the United States, residing at Wichita, in the county of Sedgwick and State of Kansas, have invented certain new and useful Improvements in Coffee-Pots, of which the following is a specification, reference being had to the accompanying drawings.

This invention relates to new and useful improvements in coffee and tea pots and more particularly to that class which are provided with movable strainers, the main object of the present invention being the provision of a coffee or tea pot having a strainer movably mounted therein whereby the same can be moved toward or away from the spout so that the spout and strainer can be readily separated when it is desired to clean the same.

Another object of the present invention is the provision of a device of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claim.

In the accompanying drawing forming a part of this application, Figure 1 is a detail transverse sectional view of a coffee pot illustrating my improved strainer applied thereto. Fig. 2 is a horizontal sectional view; and Fig. 3 is an elevation of a strainer plate.

Referring more particularly to the drawing, 1 indicates the body of the coffee pot and 2 the spout thereof. The body of the coffee pot is provided upon one side thereof opposite the spout 2 with a handle 3 and is further provided with a hinged top 4. Secured to the inner side of the coffee pot at a point opposite the spout is an angular plate 5 having an upstanding hook 6 carried thereby and removably mounted upon this hook is an arm 7, the inner end of which is provided with a slot 8, so that the same may be readily engaged over the hook 6 and then disposed at right angles to the same to prevent the arm from being disengaged from the hook. Pivotally connected to the outer end of this arm 7, is a second arm 9 to which is connected a strainer plate 10. This strainer plate is preferably of the same size and shape as the opening between the spout and the body of the coffee pot so that when the plate is placed in position, it will entirely cover the opening. This plate 10 is provided at its upper edge with a beading 11 which is adapted to correspond with the beading around the upper edge of the body of the coffee pot. The beading 11 embraces a conventional reinforcing wire which is independent of the conventional reinforcing wire which is employed in connection with the upper marginal portion of the body 1. This arrangement, however, forms no particular part of my invention as herein disclosed. As shown in Fig. 1, the plate 10 is arranged in its effective position and the arms 7 and 9 are extended horizontally so as to provide a suitable brace between the plate 10 and the opposite side of the body of the coffee pot. In order to limit the pivotal movement of the arms 7 and 9 in one direction, the arm 9 is provided at its inner end with an overturned angular flange 12, which engages over the upper edge of the inner end of the arm 7 to limit the downward pivotal movement of the arms. From this it will be apparent that when it is desired to cleanse the spout 2 and the plate 10, the inner connected ends of the arms 7 and 9 are pulled upwardly to a position illustrated by dotted lines in Fig. 1. It will be understood, however, that the plate 10 can be readily swung upwardly through the top of the coffee pot, as the arm 7 is loosely connected to the hook 6. Furthermore the arm 7 may be readily disengaged from the hook 6 by moving the same to a vertical position so that the slot 8 will be disposed in the same plane as the hook 6. Furthermore it will be noted that the downward swinging movement of the connected ends of the arms 7 and 9 is limited by the over-hanging angular flange 12. From this it will be apparent that I have provided a simple and durable device wherein the strainer plate 10 is removably applied to the opening formed between the body of the coffee pot and the spout 2, so that it may be quickly and readily removed when it is desired to cleanse the spout or the strainer plate. The device as a whole is one that can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features or departing from the scope of the invention, as defined by the appended claim.

Having thus described this invention, what I desire to claim and secure by Letters Patent, is:—

In combination with a container having an opening in a side thereof, a strainer plate for said opening, an arm carried by the plate and extending inwardly of the container, an inwardly disposed plate carried by the container at a point diametrically opposed to the opening, an upstanding hook member projecting laterally from said last named plate, an arm pivotally engaged with the first named arm and provided in its free extremity with a longitudinally disposed slot through which the hook member is adapted to project.

In testimony whereof I hereunto affix my signature in the presence of two witnesses.

MARY PARSONS.

Witnesses:
F. W. W. ROBINSON,
B. F. FORREST.

Copies of this patent may be obtained for five cents each, by addressing the "Commissioner of Patents, Washington, D. C."